(12) United States Patent
Bailly et al.

(10) Patent No.: US 8,424,633 B2
(45) Date of Patent: Apr. 23, 2013

(54) VARIABLE TRANSMISSION DEVICE FOR A VEHICLE

(75) Inventors: Gerhard Bailly, Friedrichshafen (DE); Thomas Ratzmann, Meckenbeuren (DE); Jurgen Pohlenz, Ravensburg (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 489 days.

(21) Appl. No.: 12/679,527

(22) PCT Filed: Aug. 15, 2008

(86) PCT No.: PCT/EP2008/060751
§ 371 (c)(1),
(2), (4) Date: Mar. 23, 2010

(87) PCT Pub. No.: WO2009/047031
PCT Pub. Date: Apr. 16, 2009

(65) Prior Publication Data
US 2010/0203998 A1     Aug. 12, 2010

(30) Foreign Application Priority Data

Oct. 2, 2007 (DE) .......................... 10 2007 047 194
Jul. 16, 2008 (DE) .......................... 10 2008 040 450

(51) Int. Cl.
F16H 37/02 (2006.01)
(52) U.S. Cl.
USPC ............... 180/367; 180/369; 475/72; 475/83

(58) Field of Classification Search .................. 180/65.7, 180/364, 367, 369, 305, 307; 475/23, 72, 475/83, 31, 32, 75, 207
See application file for complete search history.

(56) References Cited

U.S. PATENT DOCUMENTS

| | | |
|---|---|---|
| 2,583,656 A | 1/1952 | Lay |
| 2,808,737 A | 10/1957 | Bullard, III |
| 3,023,638 A | 3/1962 | Westbury et al. |
| 3,204,486 A | 9/1965 | Lalio |
| 3,212,358 A | 10/1965 | Lalio |
| 3,580,107 A | 5/1971 | Orshansky, Jr. |
| 3,601,981 A | 8/1971 | Ifield |
| 3,626,787 A | 12/1971 | Singer |
| 3,714,845 A | 2/1973 | Mooney, Jr. |
| 3,834,164 A | 9/1974 | Ritter |
| 4,019,404 A | 4/1977 | Schauer |
| 4,121,479 A | 10/1978 | Schauer |

(Continued)

FOREIGN PATENT DOCUMENTS

| | | |
|---|---|---|
| AT | 197 650 B | 10/1957 |
| DE | 1 069 978 | 11/1959 |

(Continued)

*Primary Examiner* — John Walters
*Assistant Examiner* — Brian Swenson
(74) *Attorney, Agent, or Firm* — Davis & Bujold, PLLC (57) ABSTRACT

A continuously variable transmission device (1) for a vehicle with a variator (3), a planetary gear unit (4) and a manual gear unit (9) arranged in a transmission housing. The variator (3) is connected with the planetary gear unit (4) and with the manual gear unit (9) in the area of a first shaft (14) and in the area of a second shaft (15). The variator (3) and the planetary gear unit (4) form a module (2) and are arranged on a common carrier plate (19).

15 Claims, 6 Drawing Sheets

U.S. PATENT DOCUMENTS

| | | | |
|---|---|---|---|
| 4,434,681 A | 3/1984 | Friedrich et al. | |
| 4,446,756 A | 5/1984 | Hagin et al. | |
| 4,563,914 A | 1/1986 | Miller | |
| 4,776,233 A | 10/1988 | Kita et al. | |
| 4,813,306 A | 3/1989 | Kita et al. | |
| 4,976,664 A | 12/1990 | Hagin et al. | |
| 5,071,391 A | 12/1991 | Kita | |
| 5,421,790 A | 6/1995 | Lasoen | |
| 5,643,122 A | 7/1997 | Fredriksen | |
| 5,667,452 A | 9/1997 | Coutant | |
| 5,766,107 A | 6/1998 | Englisch | |
| 5,868,640 A | 2/1999 | Coutant | |
| 5,890,981 A | 4/1999 | Coutant et al. | |
| 6,029,542 A | 2/2000 | Wontner | |
| 6,056,661 A | 5/2000 | Schmidt | |
| 6,485,387 B1 | 11/2002 | Goodnight et al. | |
| 6,592,485 B2 | 7/2003 | Otten et al. | |
| 6,761,658 B1 | 7/2004 | Stettler, Jr. | |
| 6,848,530 B2 * | 2/2005 | Tani | 180/292 |
| 6,986,725 B2 * | 1/2006 | Morscheck | 475/210 |
| 7,097,583 B2 | 8/2006 | Lauinger et al. | |
| 7,121,970 B2 * | 10/2006 | Funato et al. | 475/78 |
| 7,354,368 B2 | 4/2008 | Pollman | |
| 7,448,975 B2 * | 11/2008 | Reisch et al. | 475/5 |
| 7,448,976 B2 | 11/2008 | Hiraki et al. | |
| 7,828,683 B2 * | 11/2010 | Sedoni et al. | 475/73 |
| 2002/0042319 A1 | 4/2002 | Otten et al. | |
| 2003/0089107 A1 | 5/2003 | Tani | |
| 2003/0150662 A1 | 8/2003 | Tani | |
| 2003/0166430 A1 | 9/2003 | Folsom et al. | |
| 2004/0242357 A1 | 12/2004 | Ishizaki | |
| 2005/0192148 A1 * | 9/2005 | Hasegawa et al. | 475/72 |
| 2006/0094554 A1 | 5/2006 | Schmidt | |
| 2006/0276291 A1 | 12/2006 | Fabry et al. | |
| 2007/0277520 A1 | 12/2007 | Gollner | |
| 2007/0281815 A1 | 12/2007 | Gollner | |
| 2008/0085801 A1 | 4/2008 | Sedoni et al. | |
| 2008/0103006 A1 | 5/2008 | Pollman et al. | |
| 2008/0214349 A1 | 9/2008 | Liebherr et al. | |
| 2008/0214351 A1 | 9/2008 | Katayama et al. | |
| 2009/0270212 A1 | 10/2009 | Ueda et al. | |
| 2010/0056318 A1 | 3/2010 | Glockler | |

FOREIGN PATENT DOCUMENTS

| | | |
|---|---|---|
| DE | 976 055 | 1/1963 |
| DE | 1 174 126 | 7/1964 |
| DE | 1 952 966 | 4/1970 |
| DE | 27 57 399 A1 | 9/1978 |
| DE | 28 54 375 A1 | 6/1980 |
| DE | 29 04 572 A1 | 8/1980 |
| DE | 28 44 116 A1 | 7/1982 |
| DE | 80 18 579 U1 | 6/1984 |
| DE | 36 22 045 A1 | 3/1987 |
| DE | 42 06 023 A1 | 9/1993 |
| DE | 37 86 996 T2 | 12/1993 |
| DE | 94 02 493 U1 | 7/1995 |
| DE | 44 43 267 A1 | 6/1996 |
| DE | 197 51 993 A1 | 5/1998 |
| DE | 198 43 069 A1 | 5/1999 |
| DE | 100 03 174 A1 | 9/2000 |
| DE | 199 54 894 A1 | 12/2000 |
| DE | 100 47 398 A1 | 4/2002 |
| DE | 202 08 495 U1 | 1/2003 |
| DE | 601 03 717 T2 | 10/2004 |
| DE | 103 19 252 A1 | 11/2004 |
| DE | 10 2006 004 223 A1 | 8/2006 |
| DE | 10 2006 025 347 B3 | 12/2007 |
| DE | 10 2006 025 348 A1 | 12/2007 |
| DE | 11 2004 000 874 B4 | 4/2008 |
| DE | 10 2007 049 412 A1 | 5/2008 |
| EP | 0 234 135 A1 | 9/1987 |
| EP | 0 234 136 A1 | 9/1987 |
| EP | 0 235 466 A1 | 9/1987 |
| EP | 0 465 752 A1 | 1/1992 |
| EP | 0 577 282 A1 | 1/1994 |
| EP | 0 683 875 B1 | 4/1998 |
| EP | 1 541 898 A2 | 6/2005 |
| EP | 1 855 029 A2 | 11/2007 |
| EP | 1 930 627 A1 | 6/2008 |
| FR | 1197 751 A | 1/1958 |
| FR | 1 483 053 | 5/1966 |
| GB | 1 206 196 | 9/1970 |
| JP | 2007-85517 A | 4/2007 |
| WO | 86/00963 A1 | 2/1986 |
| WO | 99/15813 A3 | 4/1999 |
| WO | 00/43695 A3 | 7/2000 |
| WO | 2004/038257 A1 | 5/2004 |
| WO | 2004/072512 A1 | 8/2004 |
| WO | 2006/042434 A1 | 4/2006 |
| WO | 2007/014706 A1 | 2/2007 |
| WO | 2008/004360 A1 | 1/2008 |

* cited by examiner

VARIABLE TRANSMISSION DEVICE FOR A VEHICLE

This application is a National Stage completion of PCT/EP2008/060751 filed Aug. 15, 2008, which claims priority from German patent application serial no. 10 2007 047 194.9 filed Oct. 2, 2007 and German patent application serial no. 10 2008 040 450.0 filed Jul. 16, 2008.

FIELD OF THE INVENTION

The present invention relates to a variable transmission device for a vehicle with a variator.

BACKGROUND OF THE INVENTION

A hydrostatic-mechanical tractor transmission with a variable hydrostatic drive is known from DE 10 2006 025 348 A1. The hydrostatic drive has a hydrostatic pump driven by a combustion engine and a hydraulic motor driven by the pump. The pump and the hydraulic motor are forcibly coupled via a single common pivoting part and can be adjusted such that the pump can be pivoted between a minimum angle and a maximum angle, while the motor synchronously pivots from a maximum pivot angle to a minimum angle at the same time. The pump is designed for only one conveying direction. A mechanical operating range change gear with several shift steps, which can be shifted via a clutch, is connected downstream.

Moreover, DE 19 52 966 A discloses a transmission device with a power distribution that comprises a variator, a double planetary gear set and a manual transmission unit to realize several driving ranges. The pump means and the motor means of the variator, which is configured as a hydrostatic device, can be adjusted via a common yoke.

SUMMARY OF THE INVENTION

The underlying object of the present invention is to further develop the transmission devices known from the state of the art such that the variator and the planetary gear set can be installed in a simple manner while the transmission devices as such are assembled and can then be disassembled for servicing purposes with only a minor effort.

The continuously variable transmission device for a vehicle according to the present invention is configured with a variator, a planetary gear set and a manual transmission unit, all of which are arranged in a transmission housing, whereby the variator in the area of a first shaft and in the area of a second shaft is operatively connected to the planetary gear set and the manual transmission unit.

According to the present invention, the variator and the planetary gear set form a module and are arranged on a common carrier plate.

This means that the variator and the planetary gear set cooperating with it can be installed with minor effort as a preassembled module during the assembly of the transmission device; it also means that they can be removed in a simple manner in case of wear and tear and be replaced in the vehicle by a functioning pretested module. For servicing purposes, the module that replaces the removed module can be exchanged in the vehicle as a tested unit on the spot at low cost.

According to an advantageous further development of the transmission device according to the present invention, a shaft of the planetary gear set is operatively connected with a transmission input shaft that can be connected with a main engine of a vehicle drive train, while the two shafts of the variator are each operatively connected with other shafts of the planetary gear set. This solution allows that continuously variable adjustment of the rotational speed of the variator is superposed to the only restrictedly adjustable rotational speed of the output shaft and that at the same time, at least two shafts with continuously variable rotational speed are available in the area of the planetary gear set.

Another embodiment of the continuously variable transmission device according to the present invention is configured as a hydrostatic device having a transverse axis construction with at least one adjusting unit so that as much power as possible can be supplied to the output of the vehicle by a main engine of a vehicle via the transmission device, while at the same time, the installation space requirements for the transmission device are small.

In another embodiment of the transmission device according to the present invention, where the hydrostatic device has at least one adjustable pump means and at least one adjustable motor means that can be mutually adjusted, provision is made for transmission ratio ranges of the continuously variable transmission device having a wide spread that can be realized via the variator, the planetary gear set and the manual gear unit.

In another embodiment of the continuously variable transmission device according to the present invention, the variator is configured to be longer than it is wide and deep, and its longitudinal extension when installed in the vehicle is at least approximately vertically orientated allowing to reduce or at least avoid thrust forces that result from shock-type loads, which, for example, occur when driving over bumpy road, potholes and the like, and act on the variator and can at least briefly trigger an undesirable and uncontrolled autonomous adjustment of the variator; this advantage is especially attained when the variator is configured as a hydrostatic device in the transverse axis construction with mutual adjustment of the pump means and the motor means.

In an advantageous embodiment of the transmission device according to the present invention, where the module, when installed, is arranged in the forward driving direction and relative to a main engine of a vehicle on the right or left side of the vehicle, the module comprising the variator and the planetary gear set can be easily removed from one side of the vehicle in the lateral direction.

In an advantageous further development of the continuously variable gear device according to the present invention, the variator, when installed in the vehicle, is positioned between a main engine of the vehicle and the planetary gear set. As a result, the module comprising the variator and the planetary gear set can be easily removed by pulling off the carrier plate out of the vehicle in the forward driving direction if the transmission housing is not accessible laterally. Moreover, the module can be easily removed from the underside of the vehicle, provided the corresponding access is available, without additionally having to remove other vehicle parts.

If the variator, when installed, is arranged between the planetary gear set and the rear axle of the vehicle, then the module can be easily removed from a vehicle by pulling the carrier plate off in the reverse driving direction; here again, the module can be removed from the underside of the vehicle, provided corresponding access is provided, without additional disassembly of the vehicle or from the top of the vehicle by tilting the vehicle cabin.

In another advantageous embodiment of the continuously variable transmission device according to the present invention, the assembly of the module is simplified in the following manner: The carrier plate is detachably connected with the transmission housing and is a part of the transmission housing because during the disassembly of the module comprising the variator and the planetary gear set, only the carrier plate has to be removed from the transmission housing and the module can be removed without having to take off a the lid of the transmission housing or the like.

BRIEF DESCRIPTION OF THE DRAWINGS

Further advantages and advantageous further developments of the present invention will be apparent from the claims and the exemplary embodiments described below in principle with reference to the drawing, whereas for the sake of clarity in the description of the exemplary embodiments, the same reference numerals are used for parts identical in construction and function.

The drawings show.

DETAILED DESCRIPTION OF THE PREFERRED EMBODIMENTS

Figure 1:
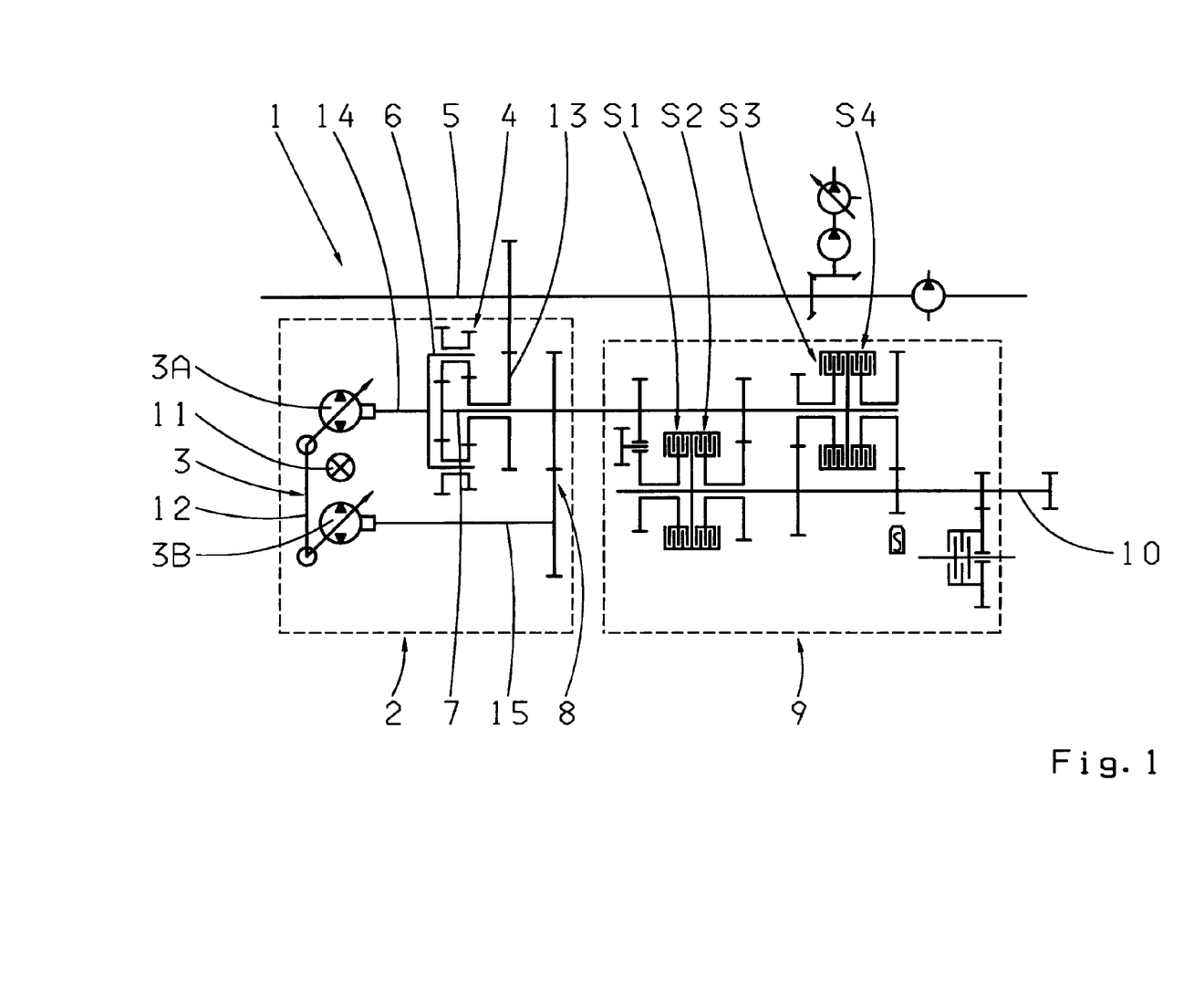
FIG. 1 a gear diagram of the continuously variable transmission device according to the present invention with a module comprising a variator and a planetary gear set.

FIG. 1 shows a gear diagram of a transmission device 1 with a continuously variable adjustment of the transmission ratio, which can be used, for example, in agricultural vehicles. In the present description, the transmission device 1 can be used to adjust three transmission ratios or drive gears for forward driving and one transmission ratio for reverse driving within which the transmission ratio of the transmission device can be continuously adjusted.

The transmission ratio of the transmission device 1 can be continuously adjusted via a continuously variable drive set or a module 2, which comprises a variator 3 and a planetary gear set 4. By means of the planetary gear set 4, the continuously variable adjustment of the rotational speed of the variator 3 is superposed to the only restrictedly adjustable rotational speed of a transmission input shaft 5 that is coupled with a main engine of a vehicle. In the area of the planetary gear set 4, this superposition provides two shafts 6, 7 of the planetary gear set 4 with continuously variable rotational speed, whereby the first shaft 6 is configured as a planetary carrier of the planetary gear set 4 and is coupled with an adjustable pump means 3A of the variator 3. The second shaft 7 is a sun gear of the planetary gear set 4, which via a spur gear tooth system 8 is operatively connected with an adjustable motor means 3B of the variator 3. The pump means 3A and the motor means 3B of the variator 3, which is configured as a hydrostatic unit, are each executed in a transverse axis construction and can be pivoted via a common yoke 12 in the region of a pivot axis 11.

The continuously variable drive set 2 is coupled with a manual gear unit 9 that is configured depending on the power of the variator 5 and also depending on the constructive embodiment of the planetary gear set 4. The power of the continuously variable drive set 2 is transmitted in the direction of a transmission output shaft via the manual gear unit 9. Moreover, the output rotational speed required in the region of the manual gear unit 9, is realized in the different transmission ratios.

The manual gear unit 9 is configured with four friction locked shifting elements S1 to S4, the reverse drive being engaged in the transmission device 1 when the first shift element S1 is engaged. The shift elements S2 to S4 are provided to realize the three forward drive gears.

A second sun gear 13 of the planetary gear set 4 is connected with the transmission input shaft 5. The variator shafts 14 and 15 are thus each coupled to a shaft 6, 7 of the planetary gear set 4 which are not directly connected with the transmission input shaft 5. Moreover, variator shafts 14 and 15 are arranged in an axially parallel manner with respect to the shafts 6, 7 of the planetary gear set 4, while the variator shaft 14 is coaxially positioned with respect to the shafts 6, 7.

Figure 2:
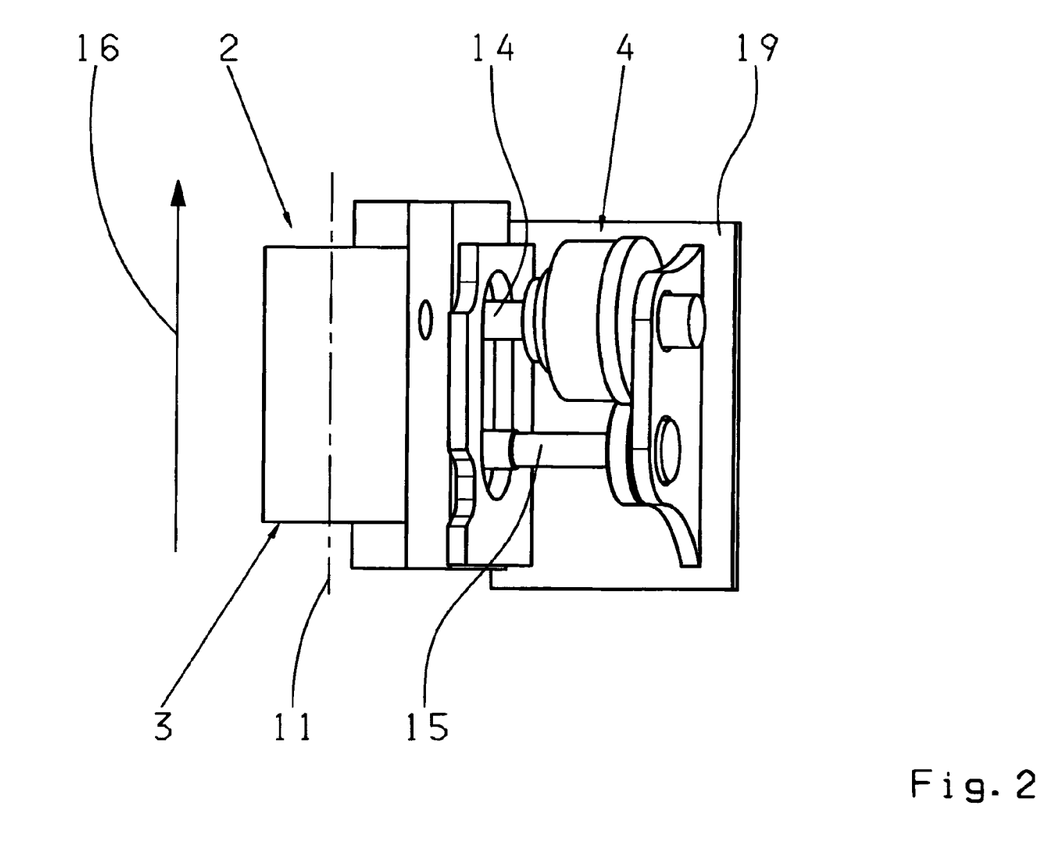
FIG. 2 an individual three-dimensional drawing showing the module of the transmission device 1 according to FIG. 1.

FIG. 2 is a detailed drawing of the continuously variable drive set and/or the module 2. The illustration according to FIG. 2 furthermore shows that both the variator 3 and the planetary gear set 4 as well as all necessary coupling shafts between the variator 3 and the planetary gear set 4 are mounted on a common carrier plate 19, which in this case forms a part of the transmission housing of the transmission device 1.

Figure 3:
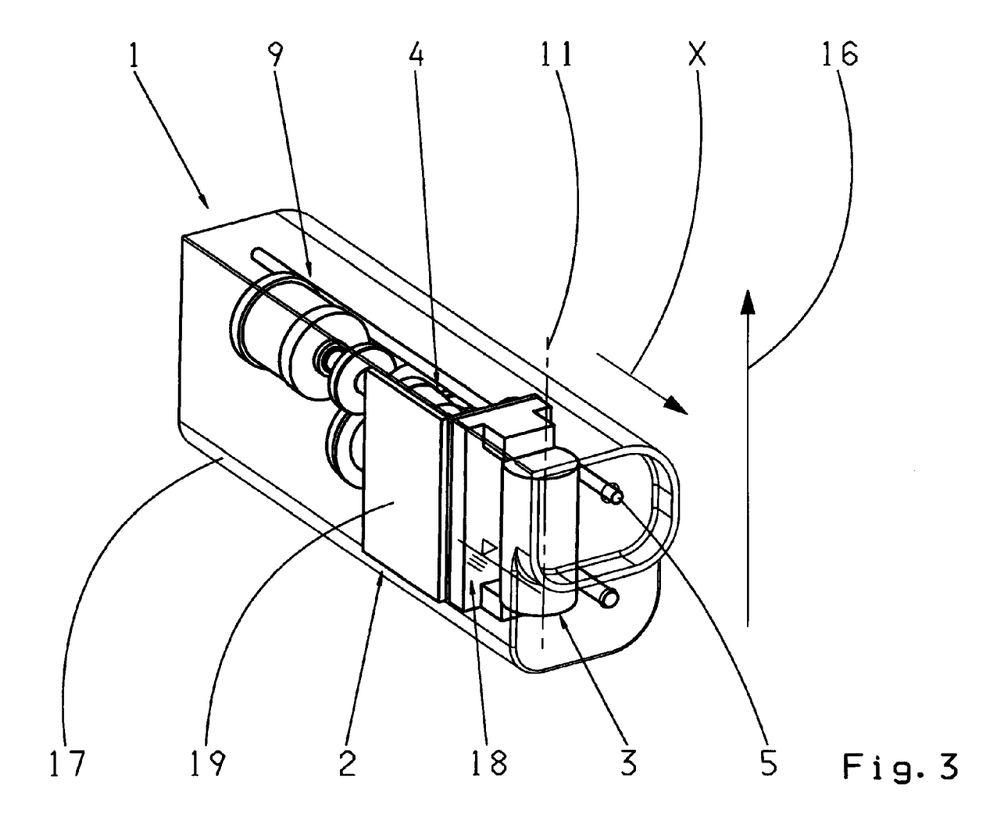
FIG. 3 a schematic three-dimensional side view of the transmission device according to FIG. 1, whereby the module, is arranged relative to the main engine in the forward driving direction on the right side of the vehicle.

In order to prevent, for a short time at least, the thrust forces adjusting autonomously and acting on the yoke 12 of the variator 3 that rigidly connects the pump means 3A and the motor means 3B to one another caused by shock-type loads, as for example, when driving over bumpy road, potholes and the like; the orientation of the pivot axis 11 of variator 3 in the installation position in the vehicle shown in FIG. 3 at least approximately corresponds to the orientation of a vehicle vertical axis 16. As a result, the effective direction of the operational forces acting on the variator 3 is essentially orientated vertically with respect to the pivot axis 11 of variator 3, which is why the forces do not adjust the variator 3, its pump means 3A and/or its motor means 3B.

In addition, in the forward drive direction of the vehicle, which is indicated in more detail by the arrow X in FIG. 3, the variator 3 is arranged between a main engine of the vehicle, not shown in more detail, and the planetary gear set 4 as well as the manual gear unit 9. The transmission device 1, in turn, is characterized in the radial direction by a smaller space requirement and, on the other hand, by a greater axial length. Due to the forward arrangement of the variator 3 in the forward driving direction X, the module 2 can be easily removed by detaching the carrier plate 19 from the transmission housing, whereby, depending on the respective design of the vehicle, the variator 3 and the planetary gear set 4, together with the carrier plate 19, can be removed from a vehicle frame 17 in the forward direction with respect to a vehicle front axle, downward with respect to an upper side of the vehicle, or upward in the direction of the vehicle vertical axis 16, or it can be removed from a vehicle frame 17, which, along with other vehicle components, limits the installation space available in the vehicle for the transmission device.

If, as in the present case, variator 3 is at least in part arranged below an oil level 18 of the transmission device 1 the variator 3 must be sealed off by adequate sealing means from the hydraulic fluid in an oil sump, not shown in more detail, of the transmission device 1 in order to easily prevent so-called churning losses during operation of the transmission device 1 and thus also any impairment of the overall efficiency of the transmission device 1.

The assembly of the variator 3 and of the planetary gear set 4 on the carrier plate 19 allows easy removal of the transmission components that are provided for realizing the continuously variable transmission ratio changes in case of a servicing operation with a minor effort and replace it by a properly functioning module, whereby the defective module 2, when servicing is needed, can be replaced in the vehicle and on the spot by a pretested unit.

Figure 4:
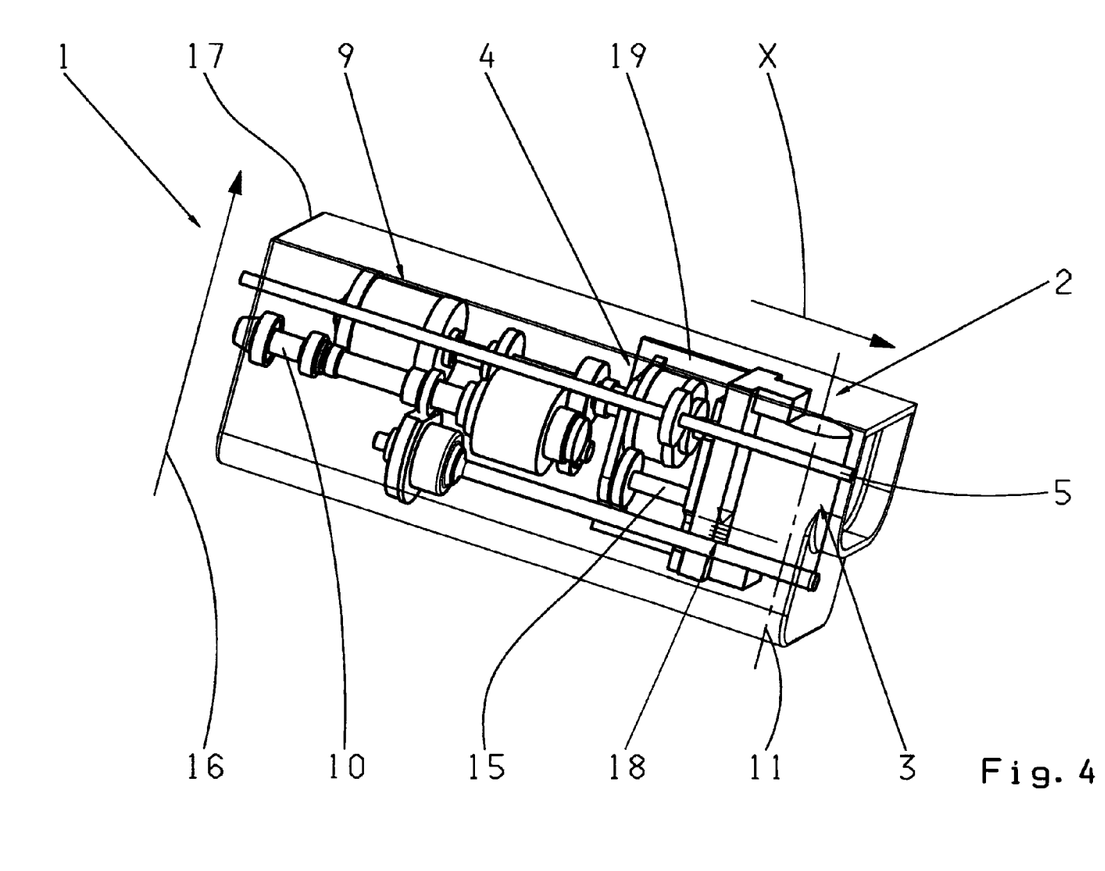
FIG. 4 an illustration of the transmission device according to FIG. 1 corresponding to FIG. 3, whereby the module is arranged in the forward driving direction on the left side of the vehicle.
Figure 5:
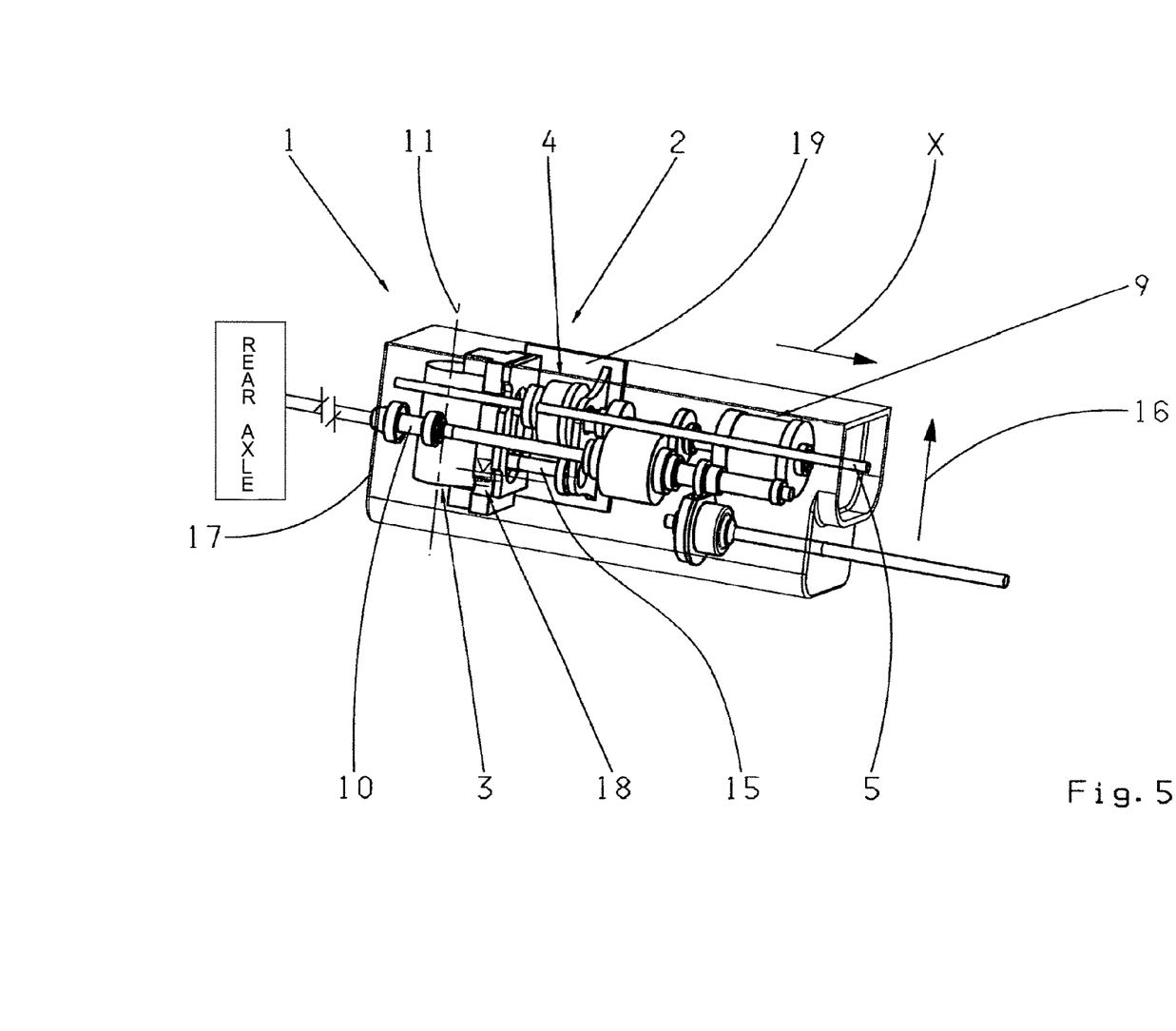
FIG. 5 an illustration corresponding to FIG. 3, whereby the module is arranged on the right side of the vehicle in front of a rear axle of the vehicle.
Figure 6:
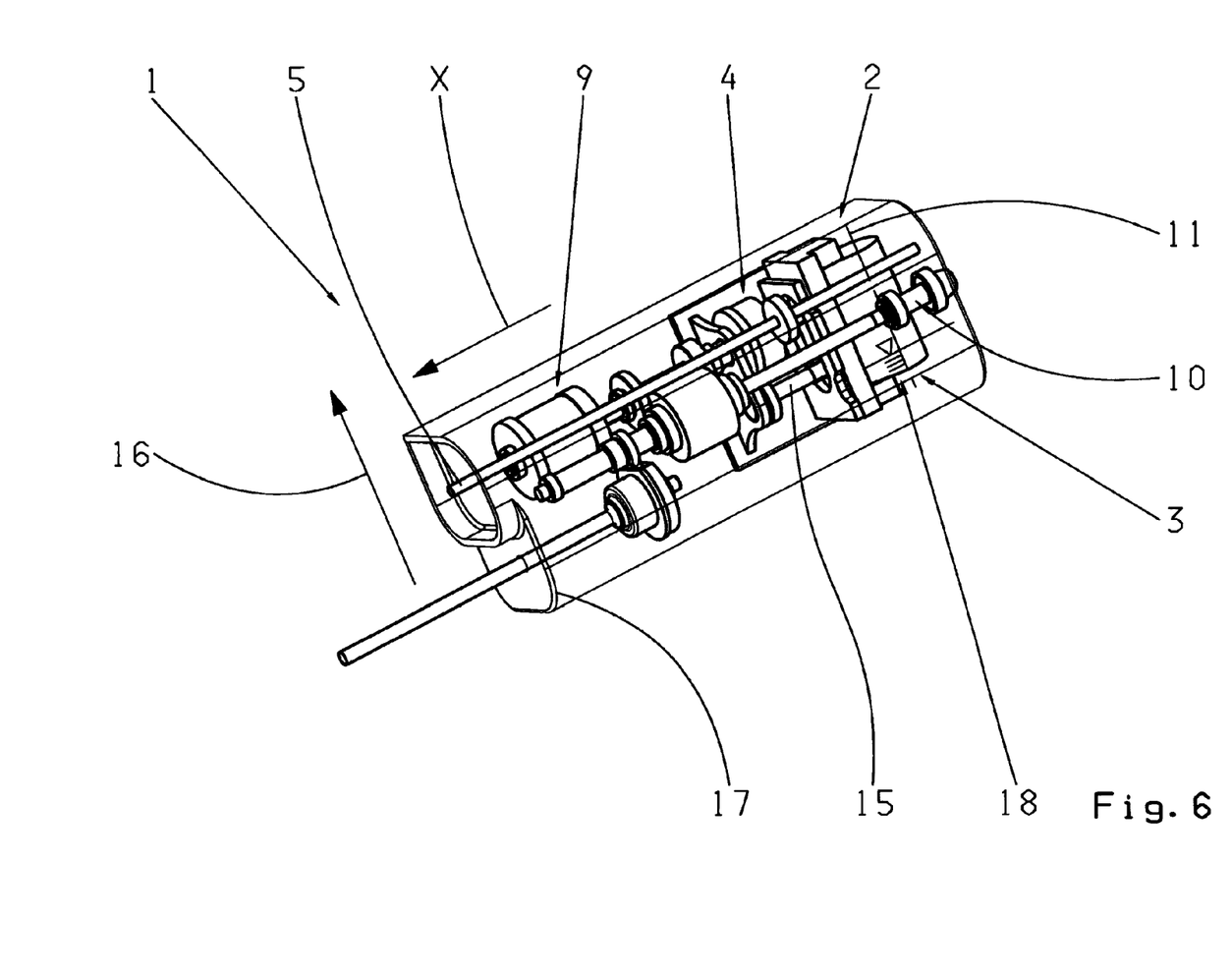
FIG. 6 an illustration corresponding to FIG. 5, whereby the module is positioned in front of the rear vehicle axle on the left side of the vehicle.

In the embodiment of the transmission device 1 shown in FIG. 4, the continuously variable drive set or module 2 is arranged in the forward drive direction X of vehicle 1 on the left side of the vehicle in an area of the transmission device 1 that faces the main engine of the vehicle. In the other embodiments of transmission device 1 shown in FIGS. 5 and 6, the module 2 in each case is arranged in front of a rear vehicle axle with respect to the forward drive direction X of the vehicle and on the right or left sides of the vehicle and can thus preferably be laterally removed from the transmission housing of the transmission device 1 after detaching the carrier plate 19 from the transmission housing.

REFERENCE NUMERALS

1 Transmission device
2 Continuously variable drive set
3 Variator
3A Pump means
3B Motor means
4 Planetary gear set
5 Transmission input shaft
6 Shaft, planet carrier
7 Shaft, sun gear
8 Spur gear tooth system
9 Manual gear unit
10 Transmission output shaft
11 Pivot axis
12 Yoke
13 Second sun gear
14, 15 Variator shaft
16 Vehicle vertical axle
17 Vehicle frame
18 Oil level
19 Carrier plate
S1 to S4 Shift element
X Forward driving direction

The invention claimed is:

1. A continuously variable transmission device (1), for a vehicle, comprising:
a variator (3),
a planetary gear set (4), and
a manual gear unit (9) all being arranged within a single transmission housing,
the variator (3) being operatively connected, via a first shaft (14) and a second shaft (15), with the planetary gear set (4) and the manual gear unit (9),
the variator (3) and the planetary gear set (4) forming a module (2) and being arranged on a common carrier plate (19),
the variator (3) having a longer length than a width and a depth thereof,
the variator (3), when installed in the vehicle, is at least approximately orientated vertically with respect a longitudinal extension of the variator (3), and
the variator (3) is a hydrostatic device comprising at least one adjustable pump (3A) and at least one adjustable motor (3B), and both the adjustable pump (3A) and the adjustable motor (3B) being mutually adjustable via a common yoke (12).

2. The continuously variable transmission device according to claim 1, wherein one shaft (13) of the planetary gear set (4) is operatively connected with a transmission input shaft (5) that is connectable with a main engine of a vehicle drive train and the first shaft (14) and the second shaft (15) of the variator are each operatively connected with other shafts (6, 7) of the planetary gear set (4).

3. The continuously variable transmission device according to claim 2, wherein the module (2), comprising the variator (3) and the planetary gear set (4) when installed in a forward driving direction (X), is arranged on either a right side or a left side of the vehicle in relation to the main engine of the vehicle.

4. The continuously variable transmission device according to claim 2, wherein the variator (3), when installed in the vehicle, is spatially positioned between the main engine and the planetary gear set (4).

5. The continuously variable transmission device according to claim 2, wherein the variator (3), when installed in the vehicle, is spatially positioned between the planetary gear set (4) and a vehicle rear axle.

6. The continuously variable transmission device according to claim 1, wherein the carrier plate (19) is detachably connected with the transmission housing and is part of the transmission housing.

7. A variable transmission device (1) for a vehicle comprising:
a manual gear unit (9) having an input shaft (7) and at least one shift element (S1, S2, S3, S4) for engaging at least one drive ratio;
a module (2) comprising a variator (3) and a planetary gear set (4) being arranged in a single common transmission housing with the manual gear unit (9);
the variator (3) being pivotally aligned with a pivot axis (11) and comprising a pump (3A) and a motor (3B), the pump (3A) being coupled, via a first shaft (14), to the planetary gear set (4), the motor (3B) being coupled, via a second shaft (15), to the input shaft (7) of the manual gear unit (9); and both the pump (3A) and the motor (3B) being adjustable via a common yoke (12); and
a carrier plate (19) supporting the variator (3) and the planetary gear set (4) in an orientation such that the input shaft (7) of the manual gear unit (9) extends from the manual gear unit (9) and engages with the planetary gear set (4) within the module (2), the input shaft (7) of the manual gear unit (9) being coaxially aligned (X) with the first shaft (14), and the pivot axis (11) being oblique to a coaxial alignment (X) of the input shaft (7) of the manual gear unit (9) and the first shaft (14) such that a length of the manual gear unit (9) and the module (2), along the coaxial alignment, is shorter than a height of the manual gear unit (9) and the module (2) along the pivot axis (11).

8. A continuously variable transmission device (1) for a vehicle comprising
a variator (3), a planetary gear set (4) and a manual gear unit (9) all being arranged in a single common transmission housing;
the planetary gear set (4) having first and second sun gears (7, 13) and a common planet carrier (6);
the variator (3) being operatively connected, via a first shaft (14) and a second shaft (15), with the planetary gear set (4) and the manual gear unit (9);
the variator (3) and the planetary gear set (4) forming a module (2) and being arranged on a common carrier plate (19);

a length of the variator (3) being longer than a width and a depth thereof;

the variator (3) comprising a pump (3A) and a motor (3B) which are both driven by via a common yoke (12); and the variator (3), following installation in the vehicle, being orientated at least approximately vertically with respect a longitudinal extension of the variator (3).

9. The continuously variable transmission device according to claim 8, wherein the variator (3) is a hydrostatic device having a transverse axis construction.

10. The continuously variable transmission device according to claim 9, wherein each of the adjustable pump (3A) and the adjustable motor (3B) are mutually adjustable.

11. The continuously variable transmission device according to claim 8, wherein the first shaft (14) of the variator (3) is directly connected to the planet carrier (6).

12. The continuously variable transmission device according to claim 8, wherein an input shaft (7) of the manual gear unit (9) is directly connected to one of the first and the second sun gears (7) of the planetary gear set (4).

13. The continuously variable transmission device according to claim 8, wherein the variator (3) has a transverse axis construction.

14. The continuously variable transmission device according to claim 8, wherein the first and the second sun gears (13) are coaxial with one another and only one of the first and the second sun gears (13) directly engages with a transmission input shaft (5) of the manual gear unit (9).

15. The continuously variable transmission device according to claim 1, wherein the variator (3) has a transverse axis construction.

* * * * *